United States Patent
Rose et al.

(10) Patent No.: US 9,867,498 B2
(45) Date of Patent: Jan. 16, 2018

(54) COOKING DEVICE WITH HANDLE, SHAFT, FORK, AND FOOD REMOVAL COMPONENT/IMPLEMENT

(71) Applicants: Gordon Timothy Rose, Franklin, TN (US); Clyde Taylor, Nashville, TN (US)

(72) Inventors: Gordon Timothy Rose, Franklin, TN (US); Clyde Taylor, Nashville, TN (US)

( * ) Notice: Subject to any disclaimer, the term of this patent is extended or adjusted under 35 U.S.C. 154(b) by 0 days.

(21) Appl. No.: 14/541,117

(22) Filed: Nov. 13, 2014

(65) Prior Publication Data

US 2016/0135642 A1    May 19, 2016

(51) Int. Cl.
*A47J 37/04*    (2006.01)
(52) U.S. Cl.
CPC .................................. *A47J 37/049* (2013.01)
(58) Field of Classification Search
CPC   A47J 37/049; A47J 34/04; A47J 43/18; A47J 37/04
USPC .......................... 99/419, 421 A, 449; 264/61
See application file for complete search history.

(56) References Cited

U.S. PATENT DOCUMENTS

| | | | | |
|---|---|---|---|---|
| 2,191,226 A * | 2/1940 | Clem | ................... | A47J 37/0694 294/50 |
| 3,078,787 A * | 2/1963 | Arseneault | ............ | A47J 43/283 294/61 |
| 4,539,751 A * | 9/1985 | Chan | ................... | A47J 37/0694 30/322 |
| 6,457,758 B1* | 10/2002 | Gerdes | ..................... | E01H 1/12 294/24 |
| 6,957,492 B1* | 10/2005 | Westfall | ................ | A47J 43/288 30/143 |

\* cited by examiner

*Primary Examiner* — David Angwin
*Assistant Examiner* — Justin Dodson
(74) *Attorney, Agent, or Firm* — Paul D. Strain, Esq.; Strain & Strain PLLC

(57) ABSTRACT

The apparatus is used in cooking foodstuff over an open flame by heat while keeping user a safe distance from fire with main elements being hand grip, shank, fork, and food transfer system. A hand grip and shank are made of materials including wood, injection mold plastics, and metal while a fork and food transfer system is constructed of metal materials. The food transfer system provides a hands-free safe and sanitary method to remove cooked foods from hot metal greatly reducing likelihood of injury and food contamination.

1 Claim, 19 Drawing Sheets

COOKING DEVICE WITH HANDLE, SHAFT, FORK, AND FOOD REMOVAL COMPONENT/IMPLEMENT

BACKGROUND OF INVENTION

The invention comprises an apparatus for preparing, treating, or cooking substances (foods) intended to be eaten and/or drunk by human beings or animals for their nourishment.

Foodstuffs, safety and handling are priority issues for all consumption including open fire roasting. The practical aspect of an apparatus's length places the user a safe distance from the heat. The transfer from the prongs of the apparatus to a serving container solves concerns of foods being touched by individuals other than the person consuming the foods.

BRIEF SUMMARY OF INVENTION

Invention enhances any food roasting experience by providing user with a durable, sturdy and safe-to-use contrivance utilizing materials that are designed to function near heat and fire. The apparatus's primary objective allows user to roast foodstuff a safe distance from heat and flame thus insuring sanitary hands-free removal of roasted food eliminating food contamination by direct handling. Device assures removing food to be free from further potential befoulment.

DETAILED DESCRIPTION OF THE PREFERRED EMBODIMENTS

Figure 1:
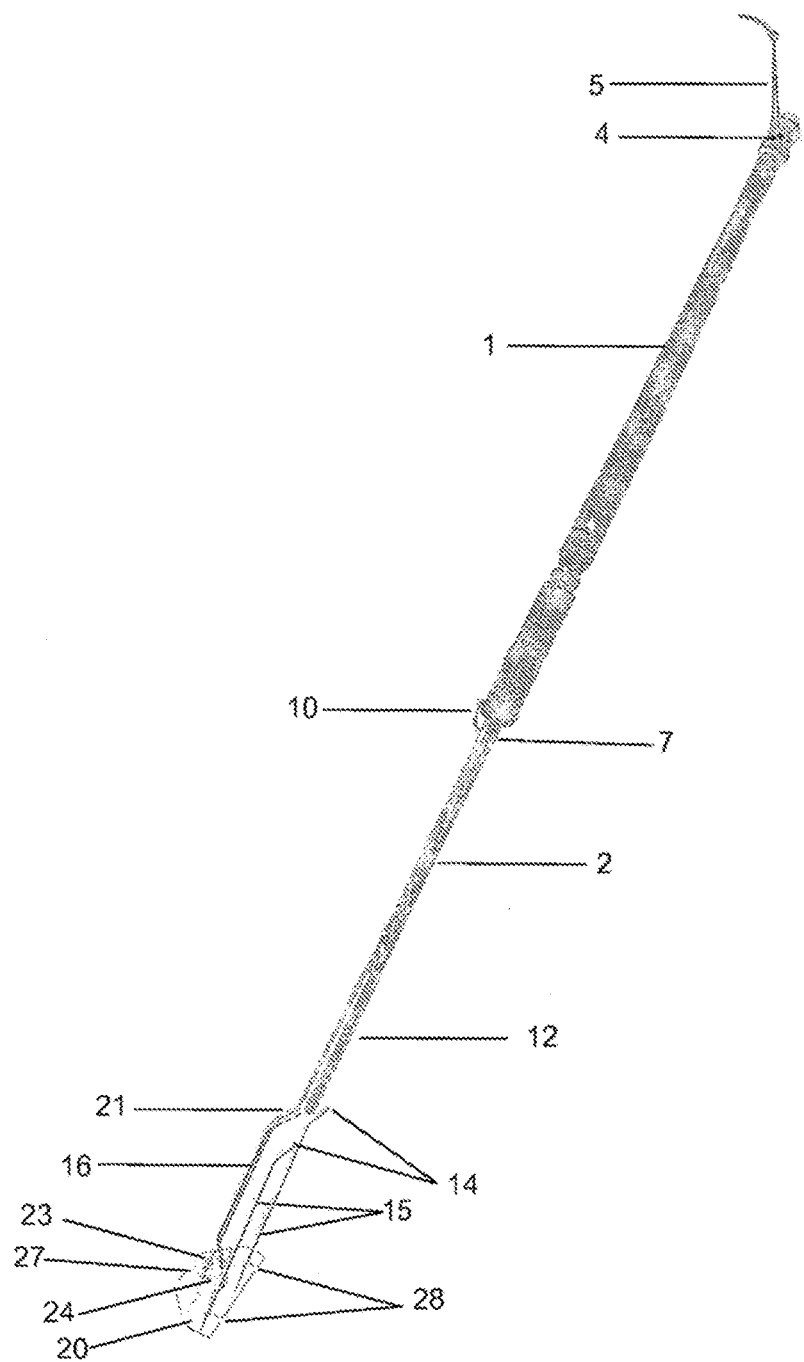
FIG. 1 depicts an embodiment of the Rearward Tine Roaster Side, Perspective View, according to the present application.
Figure 2:
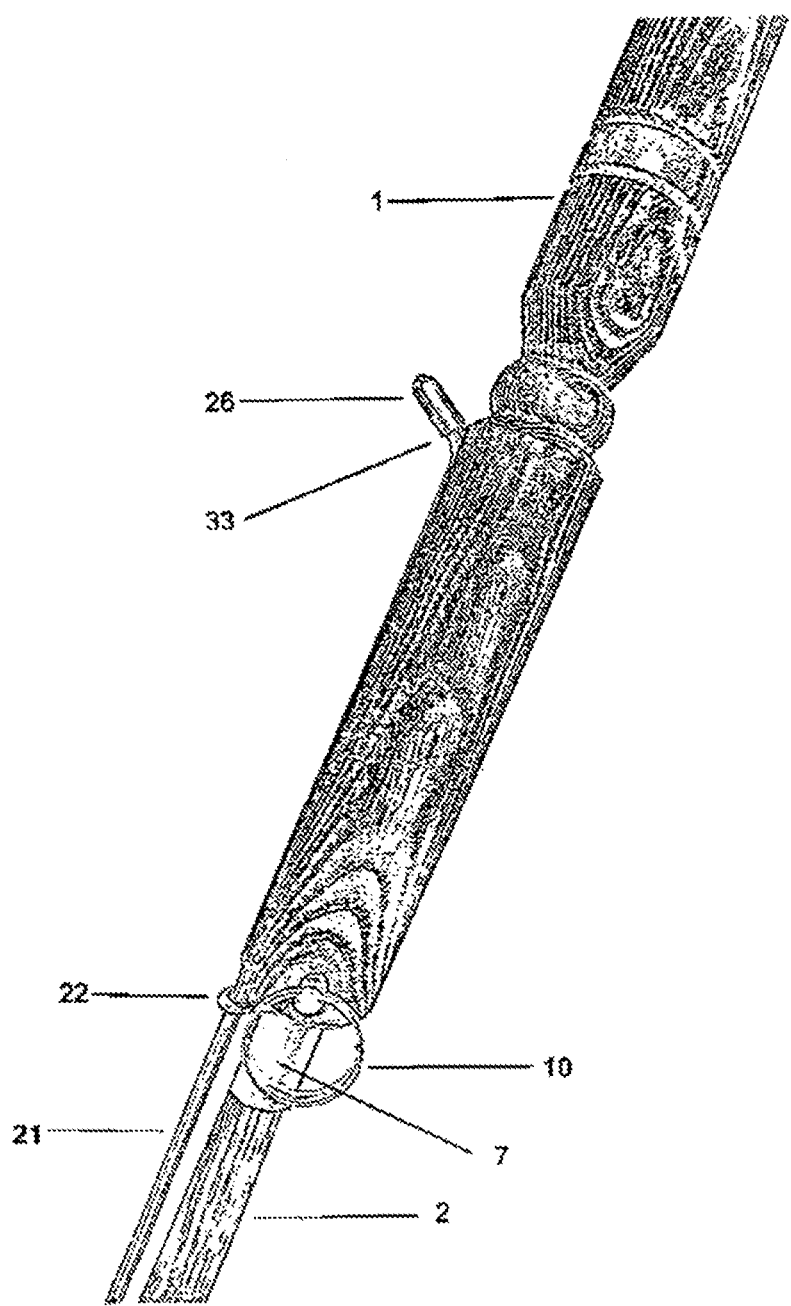
FIG. 2 depicts a section view of an embodiment of the Rearward Tine Roaster Right Side, Section View, according to the present application.
Figure 3:
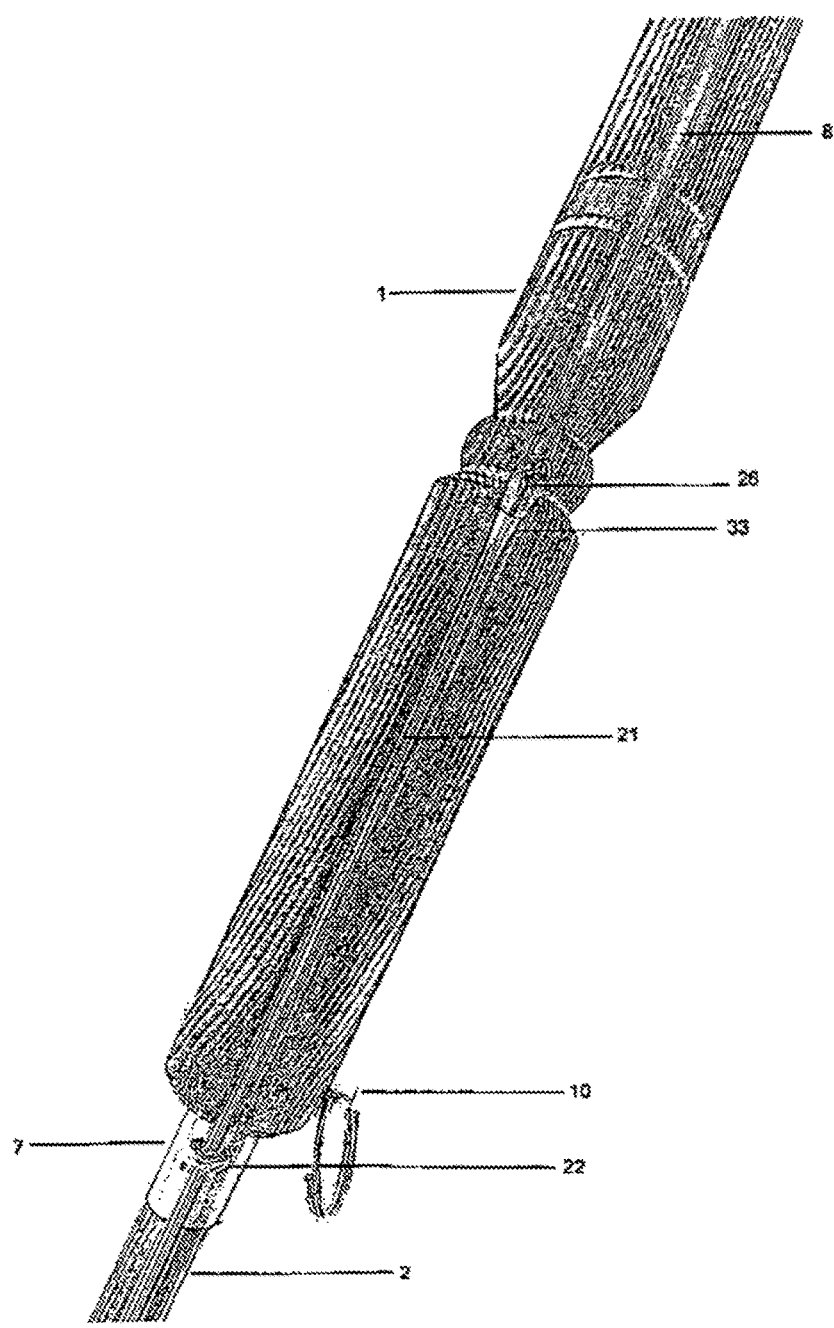
FIG. 3 depicts a section view of an embodiment of the Rearward Tine Roaster Top, Section View, according to the present application.
Figure 4:
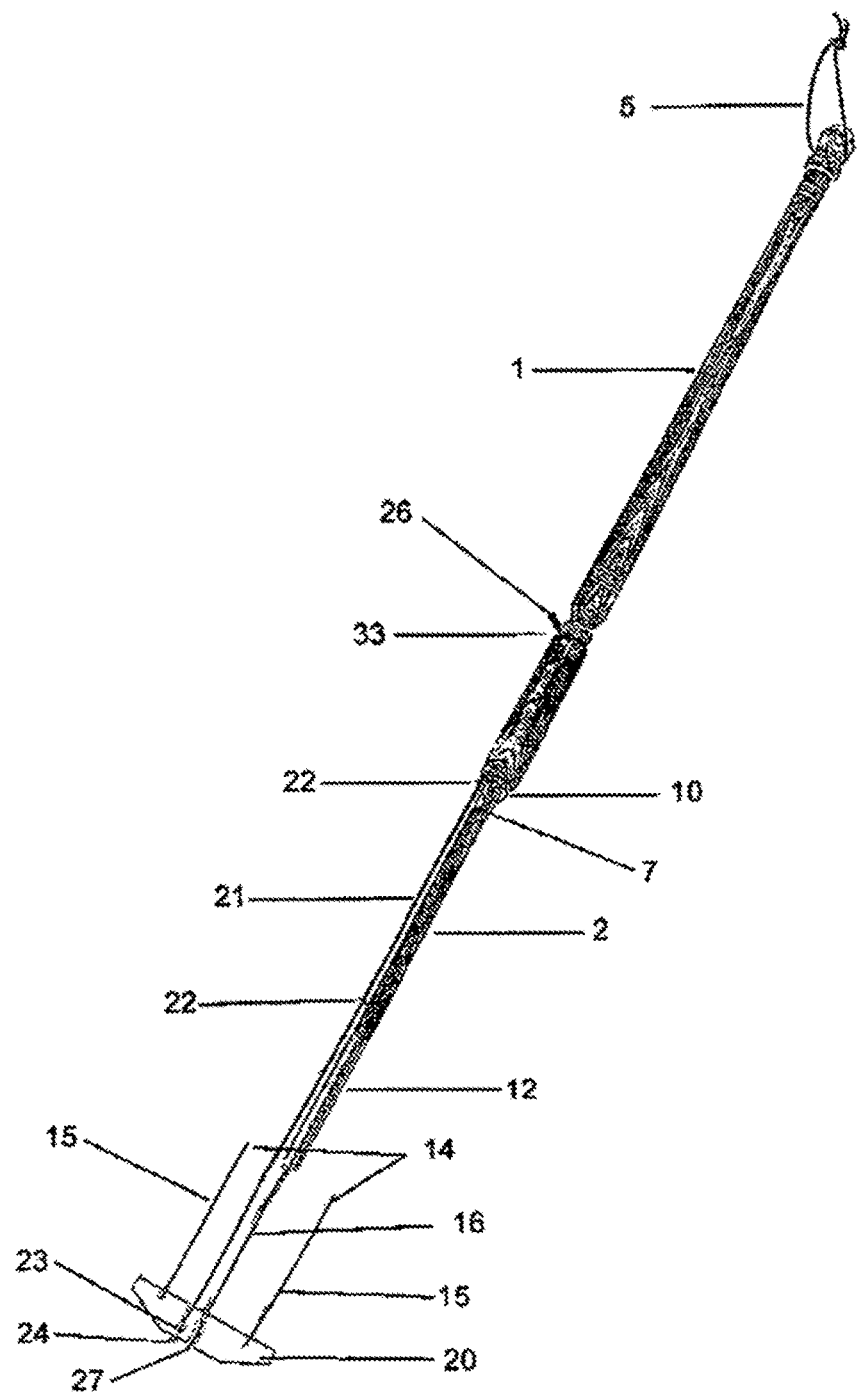
FIG. 4 depicts a section view of an embodiment of the Rearward Tine Roaster Front, Perspective View, according to the present application.
Figure 5:
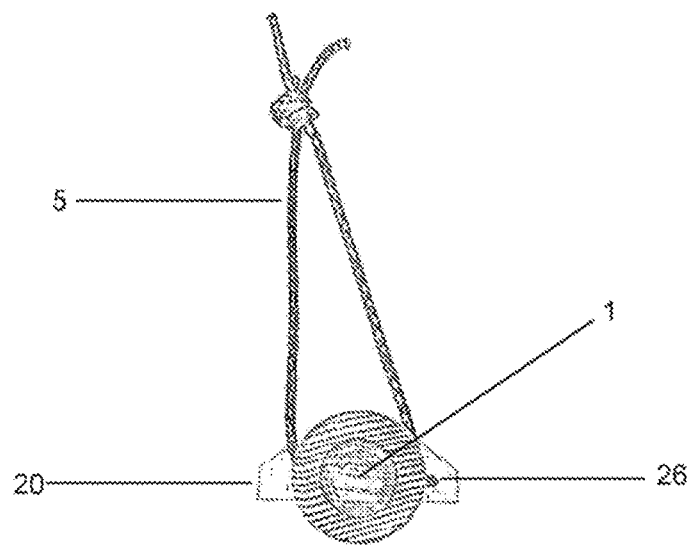
FIG. 5 depicts a section view of an embodiment of the Rearward Tine Roaster Top and Bottom, Plan View, according to the present application.
Figure 5:
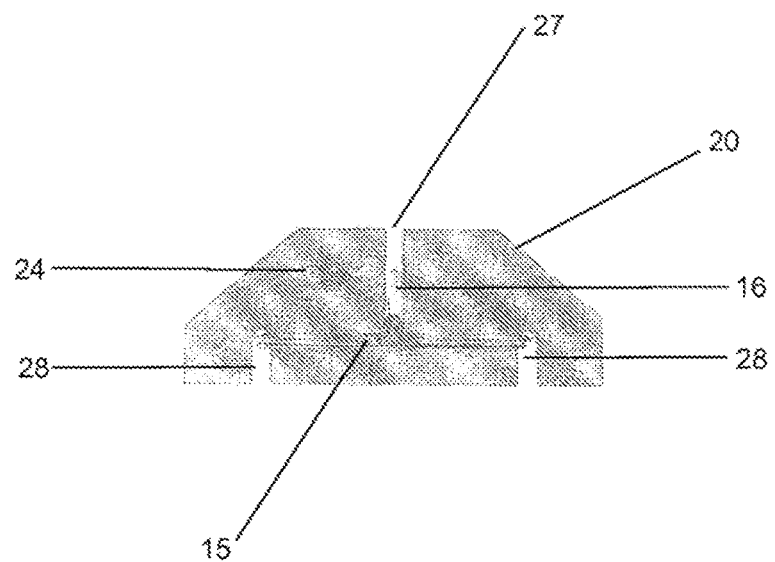
Figure 6:
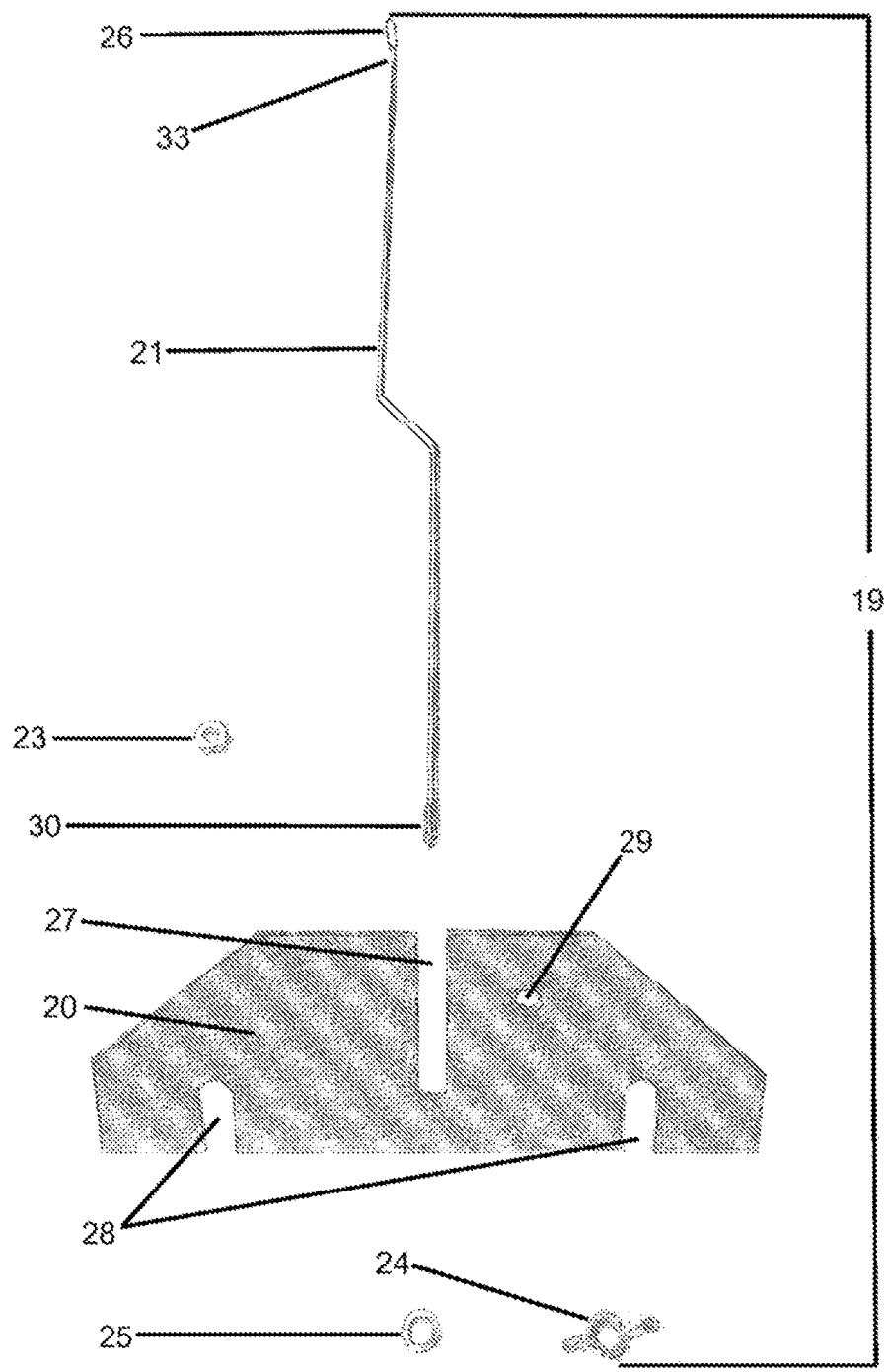
FIG. 6 depicts a section view of an embodiment of the Rearward Food Removal System, Exploded View, according to the present application.
Figure 7:
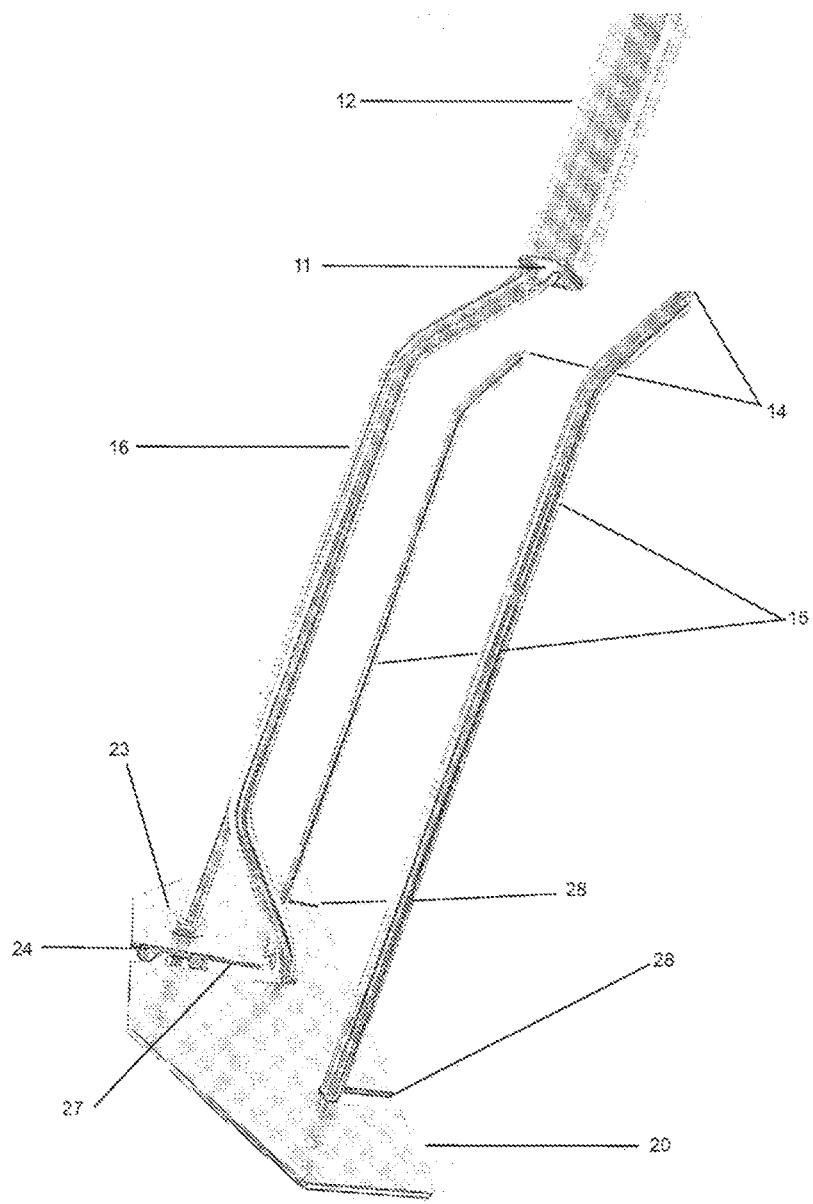
FIG. 7 depicts a section view of an embodiment of the Rearward Food Removal Tine, Section View, according to the present application.
Figure 8:
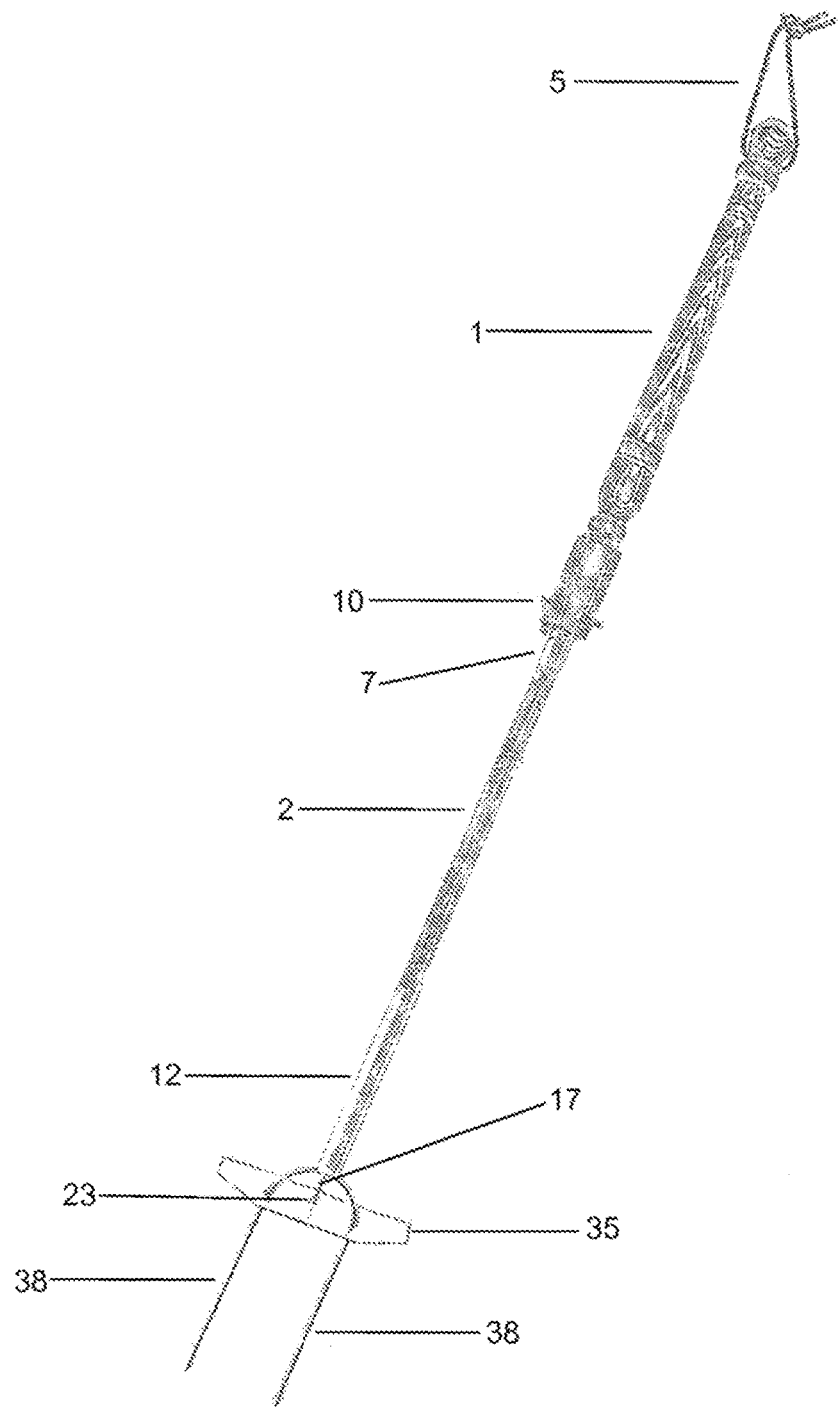
FIG. 8 depicts a section view of an embodiment of the Forward Tine Roaster Front, Perspective View, according to the present application.
Figure 9:
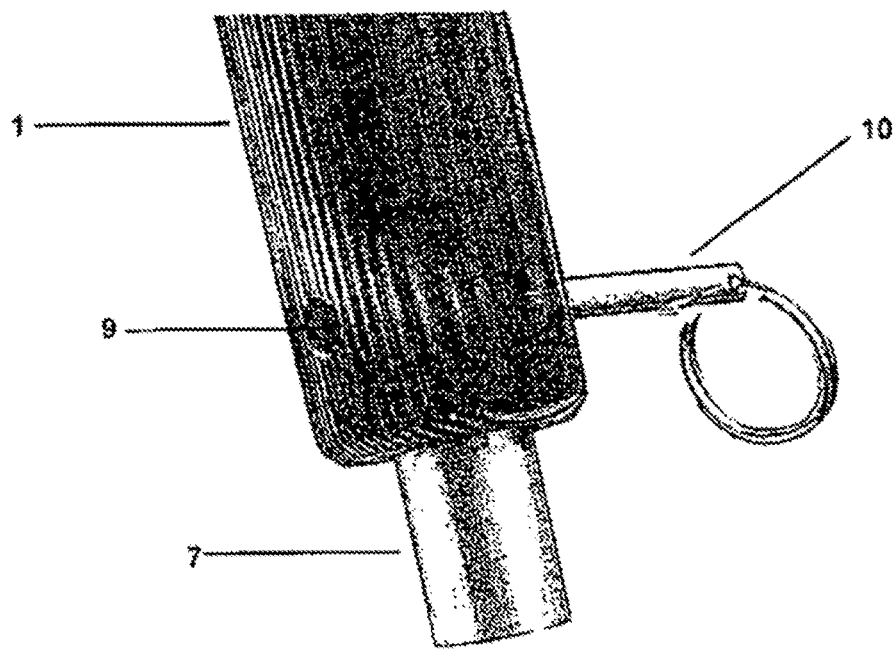
FIG. 9 depicts a section view of an embodiment of the Forward Roaster Handle—Shaft, Exploded View, according to the present application.
Figure 9:
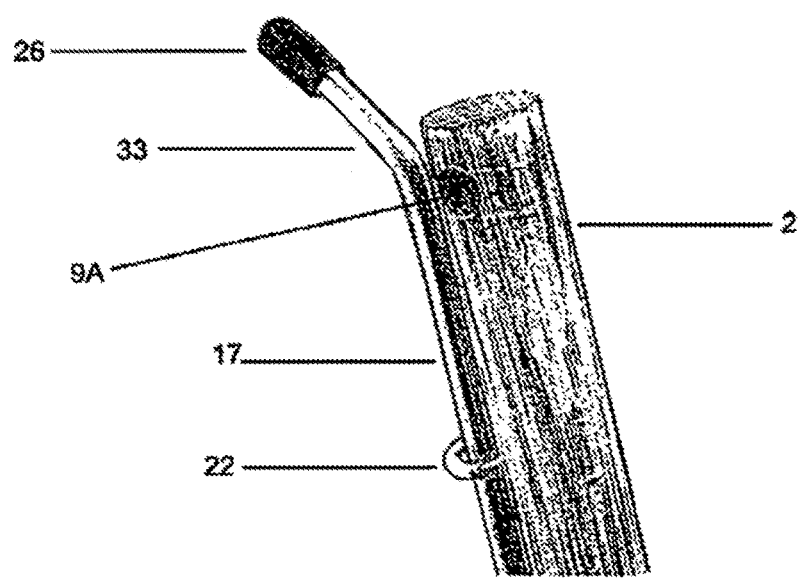
Figure 10:
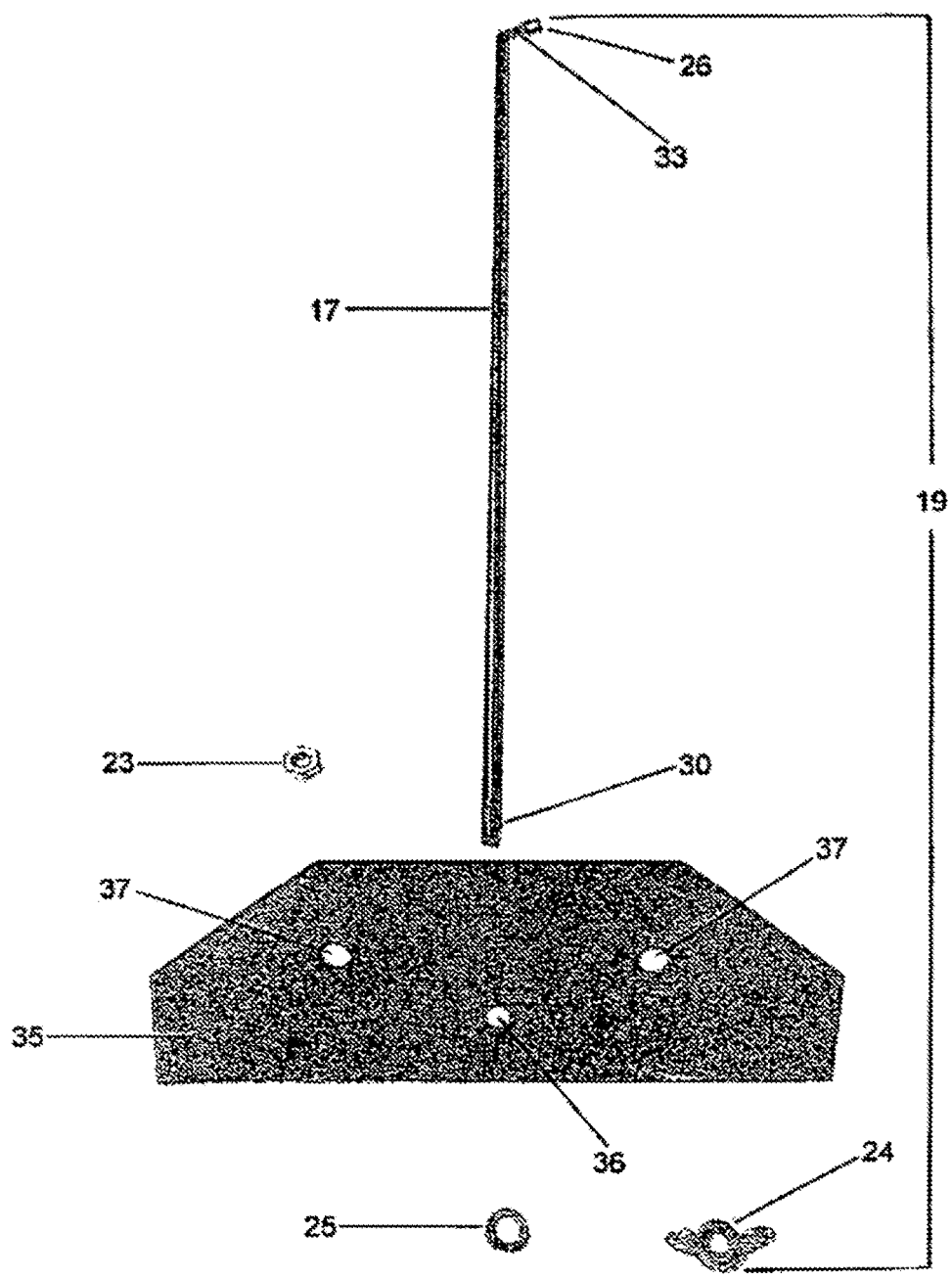
FIG. 10 depicts a section view of an embodiment of the Forward Food Removal System, Exploded View, according to the present application.
Figure 11:
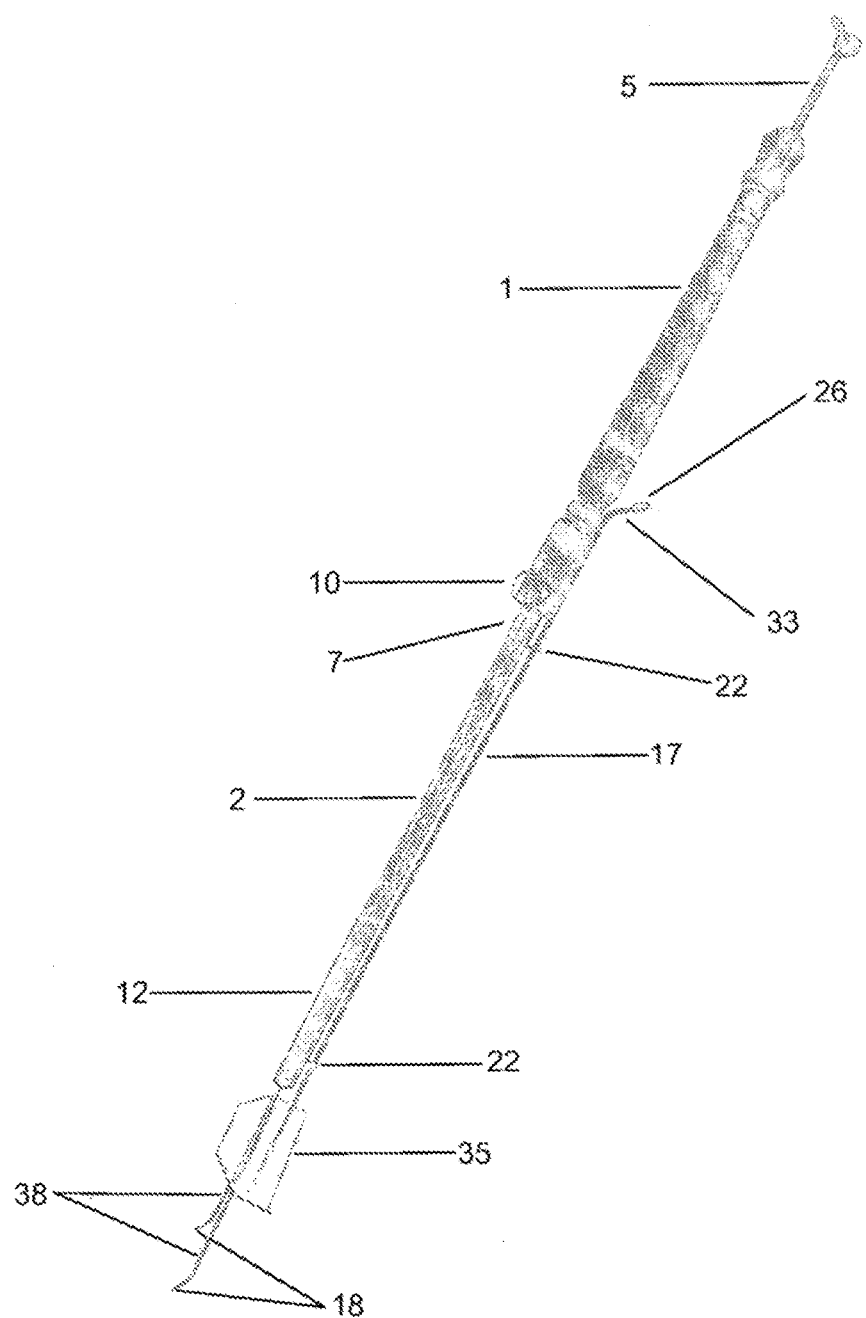
FIG. 11 depicts a section view of an embodiment of the Forward Tine Roaster, Side View Perspective, according to the present application.
Figure 12:
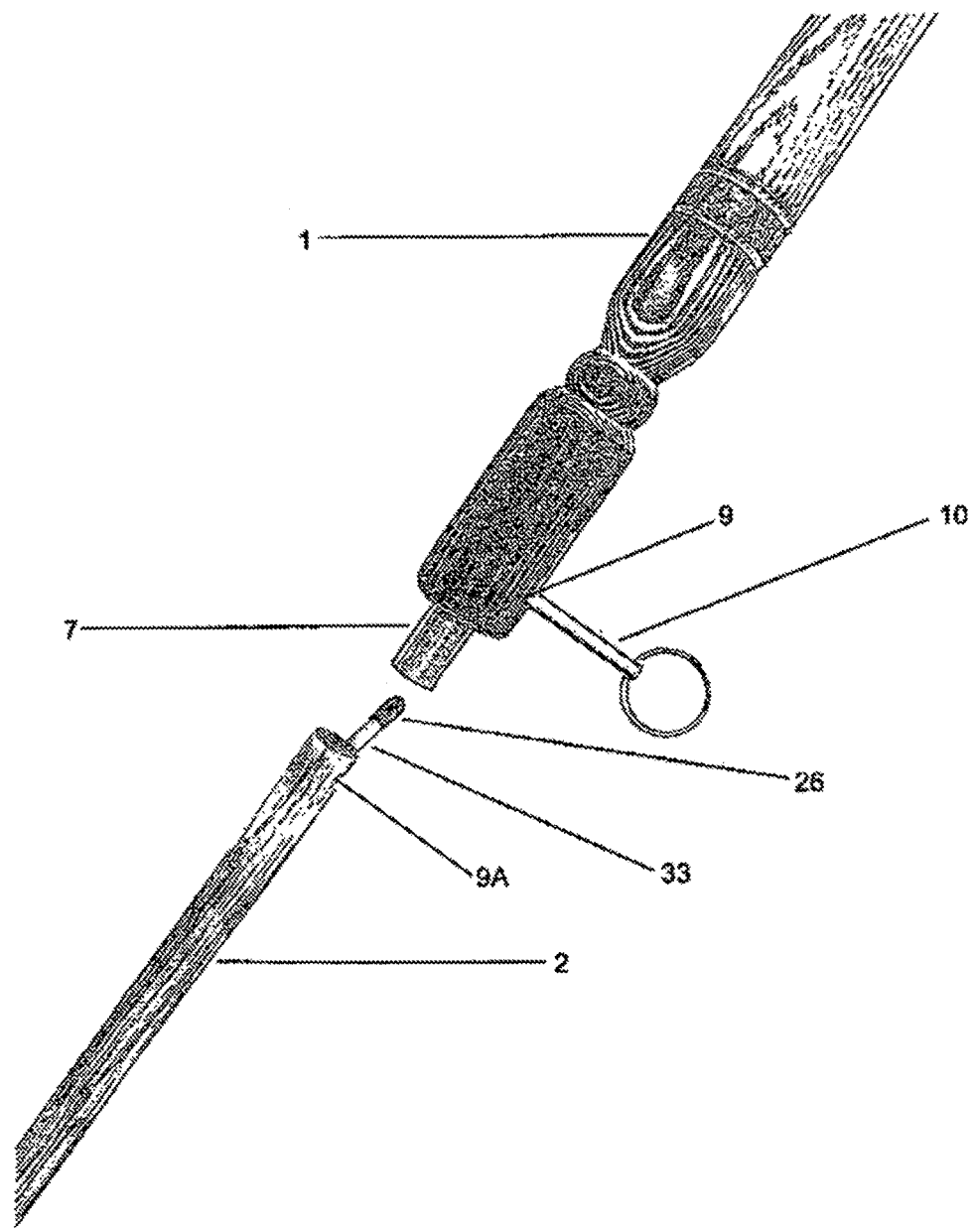
FIG. 12 depicts a section view of an embodiment of the Forward Tine Roaster, Exploded Front View, according to the present application.
Figure 13:
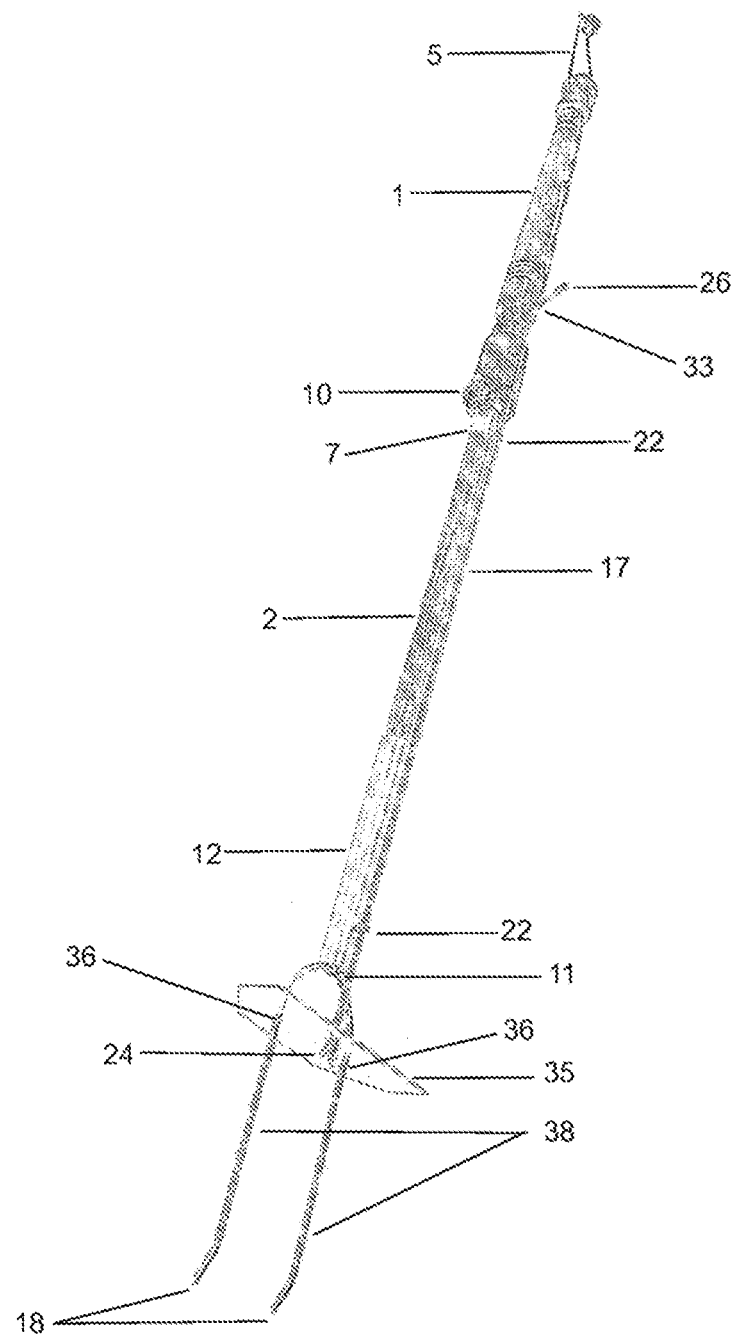
FIG. 13 depicts a section view of an embodiment of the Forward Tine Roaster, Left Rear, Perspective View, according to the present application.
Figure 14:
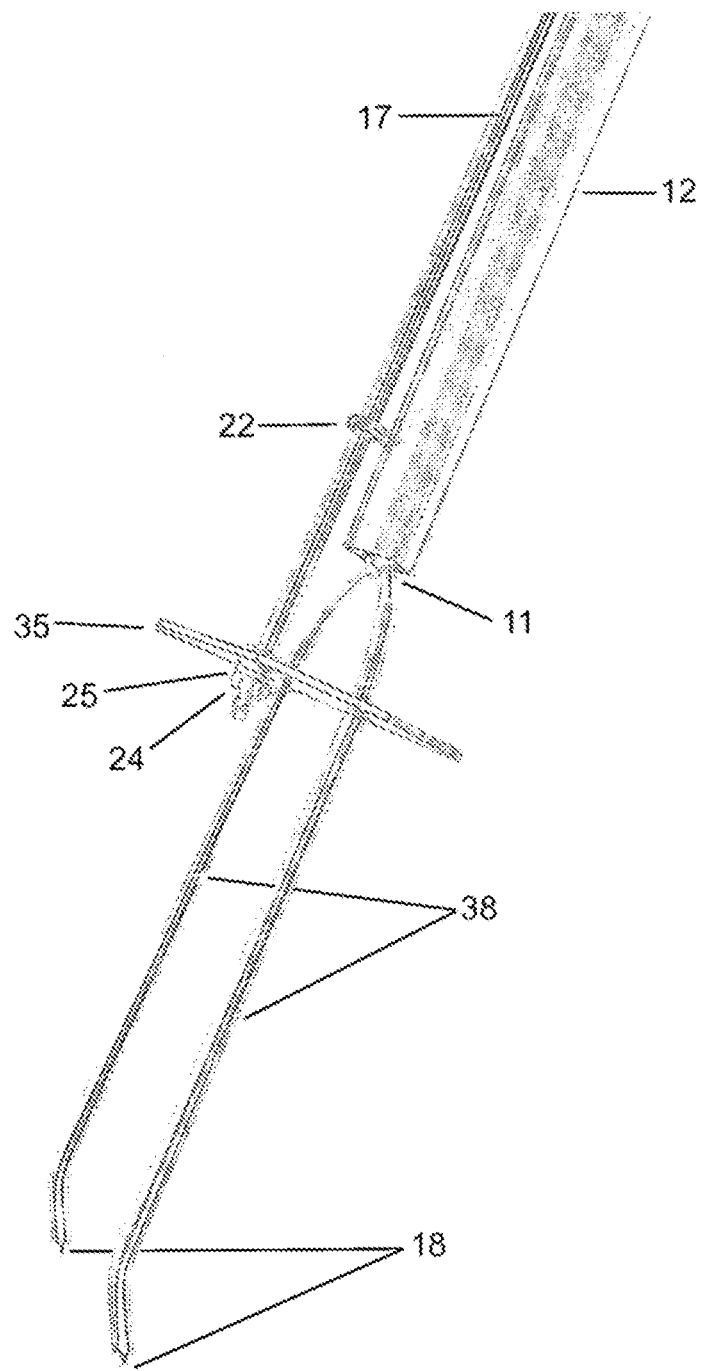
FIG. 14 depicts a section view of an embodiment of the Forward Tine Food Removal, Section View, according to the present application.
Figure 15:
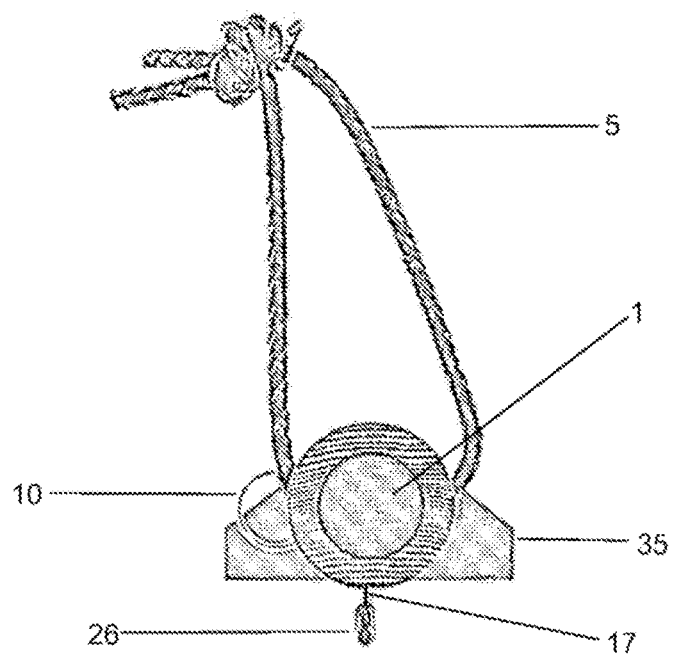
FIG. 15 depicts a section view of an embodiment of the Forward Tine Roaster Top and Bottom, Plan View, according to the present application.
Figure 15:
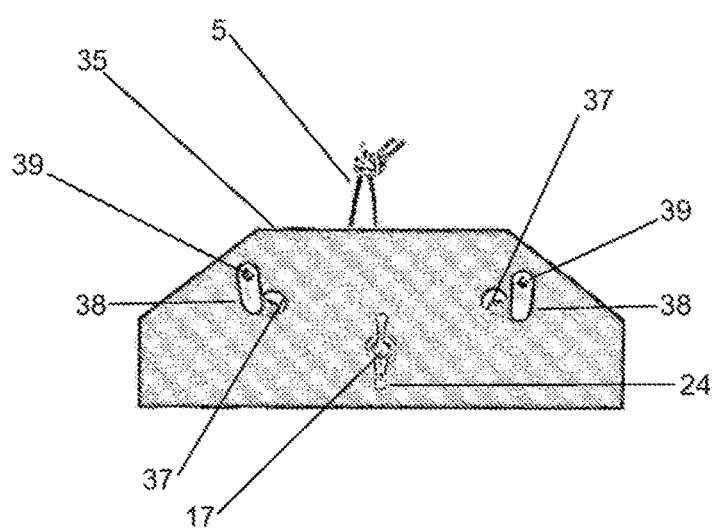
Figure 16:
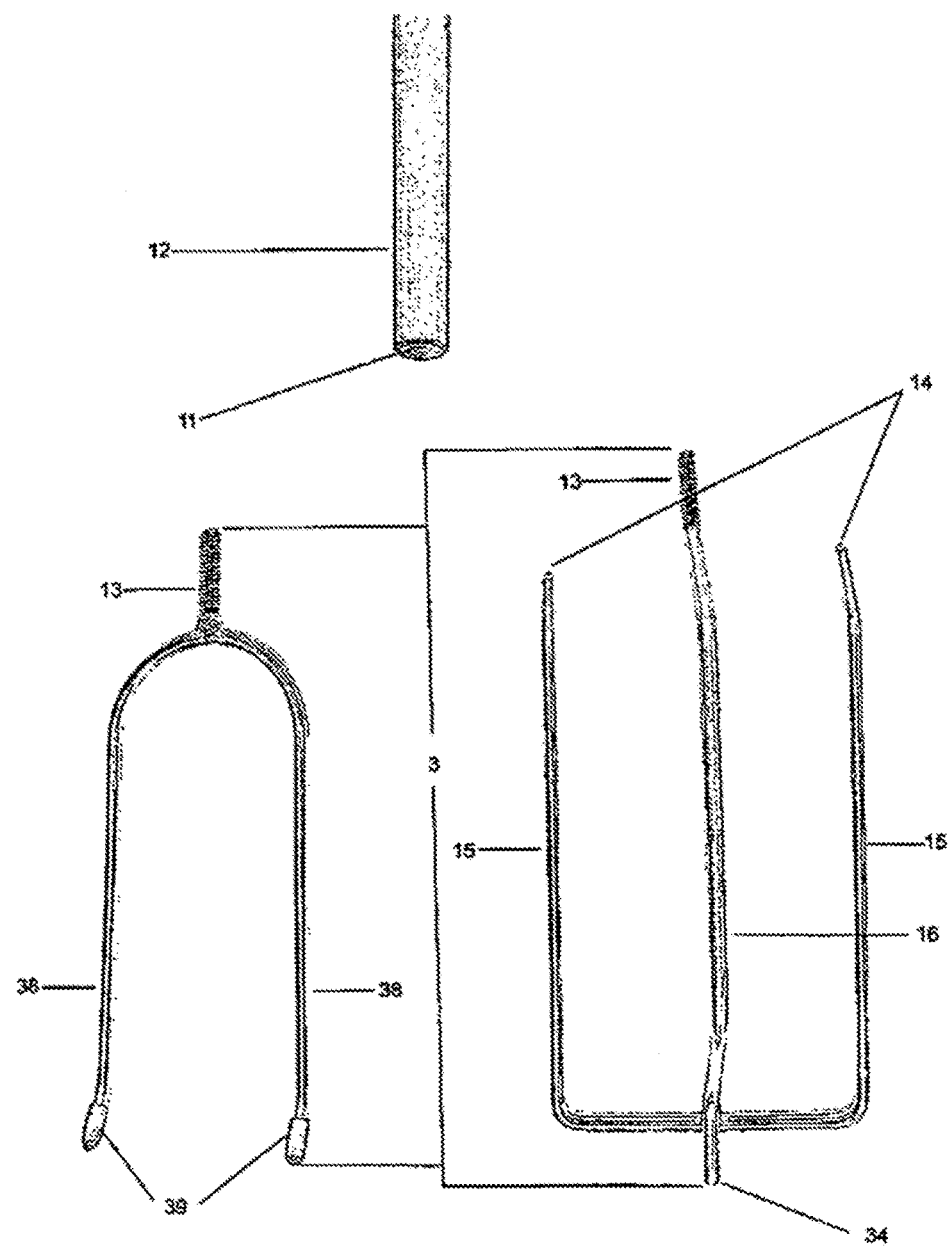
FIG. 16 depicts a section view of an embodiment of the Forward And Rearward Tine Roasters with Shaft, Plan View, according to the present application.
Figure 17:
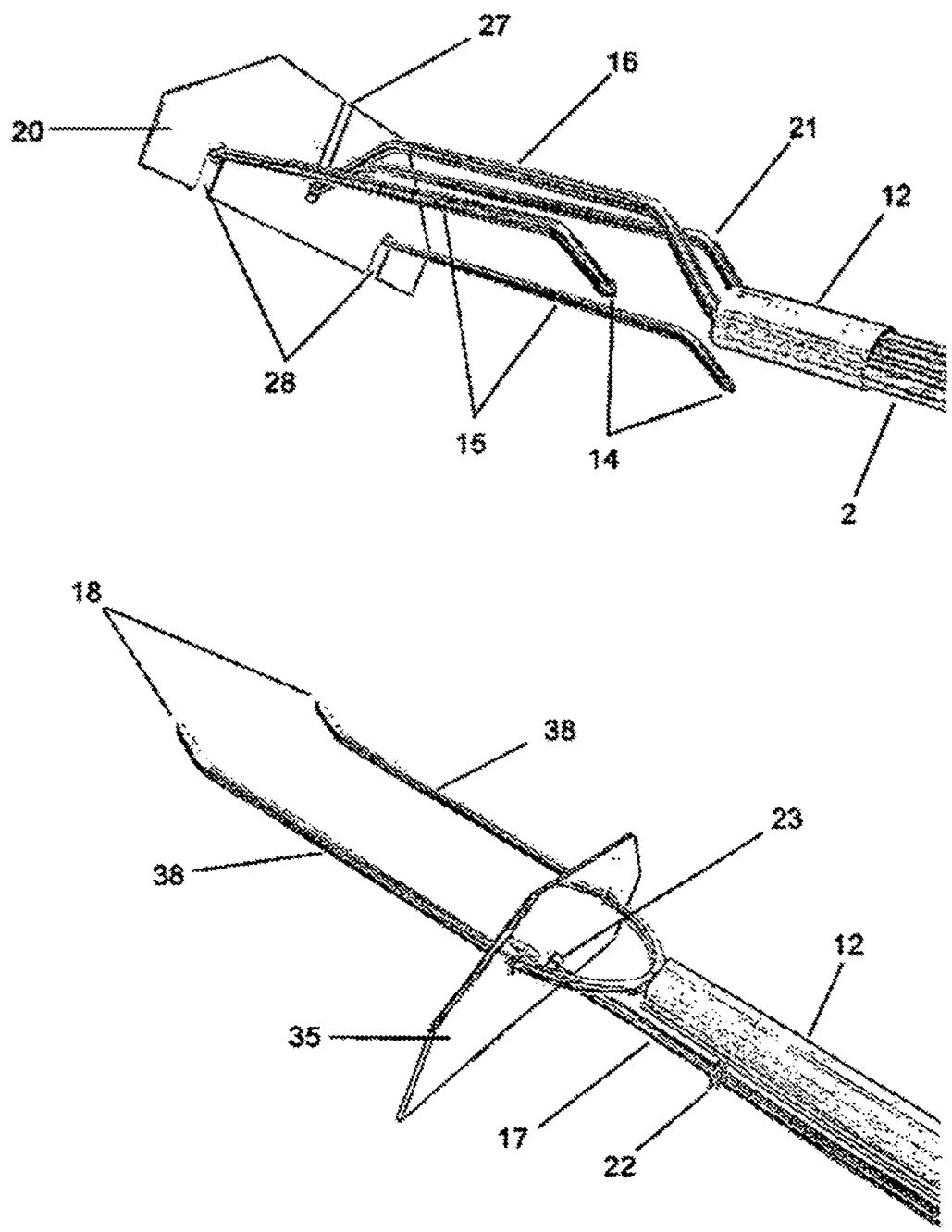
FIG. 17 depicts a section view of an embodiment of the Forward And Rearward Tine Plus Shaft with Copper Sleeve Food Removal System, Section View, according to the present application.
Figure 18:
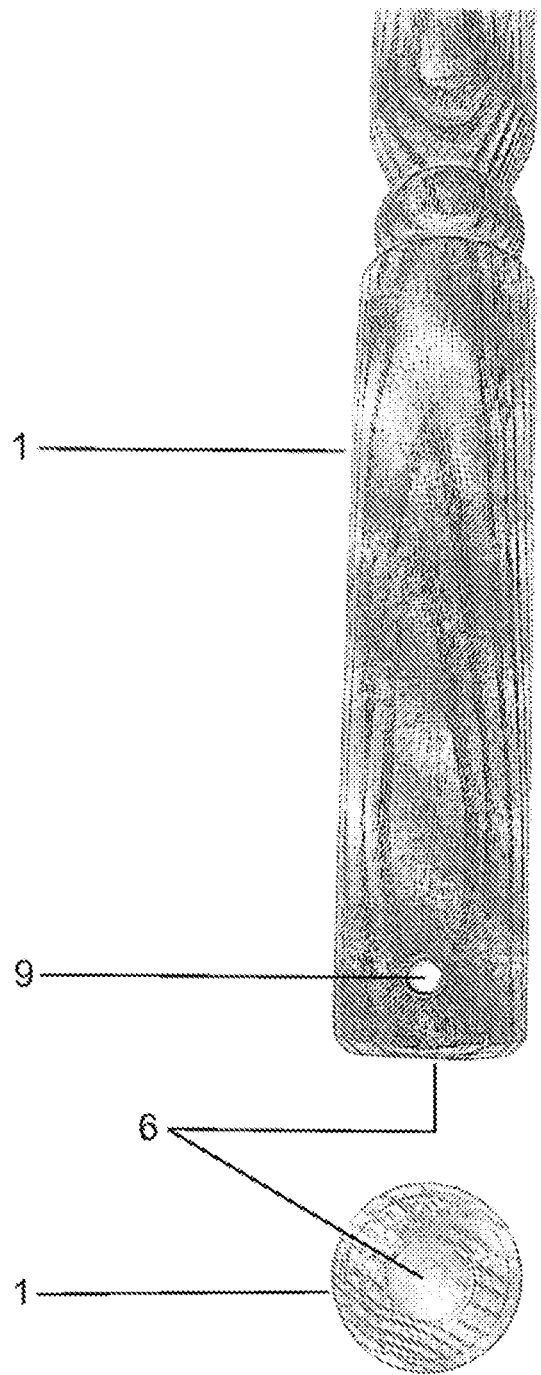
FIG. 18 depicts a section view of an embodiment of the Handle Side—Bottom, Plan View, according to the present application.
Figure 19:
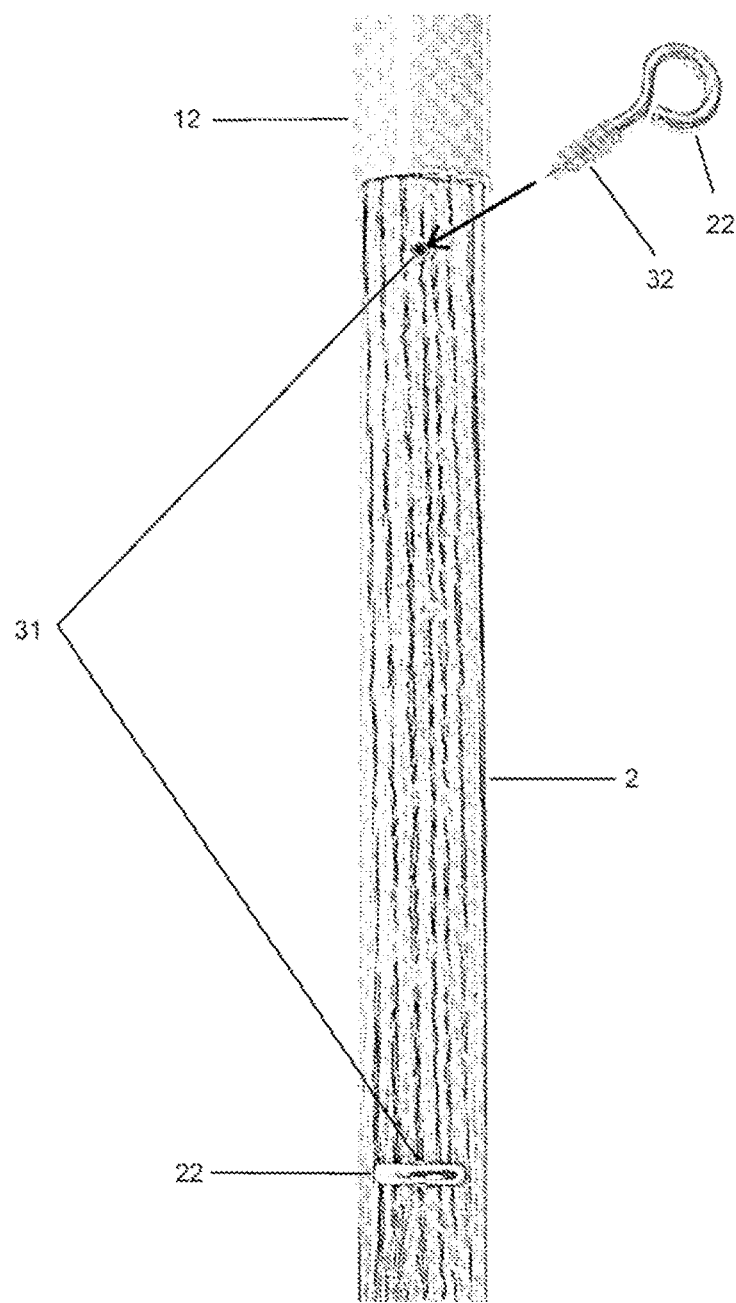
FIG. 19 depicts a section view of an embodiment of the Shaft Holes for Eyehooks with Copper Sleeve, Plan View, according to the present application.

Components of preferred embodiments of the rearward or forward fork roasting apparatuses include but are not limited to the following:

Hand grip 1: located at uppermost end of apparatus; a contrivance to be grasped by the user. Shank 2: a wooden, plastic or metal rod connecting hand grip 1 to fork 3. Fork 3: located at opposite end from hand grip 1; a metal fork consists of two prongs. Food transfer system 19: a device designed to remove hot food in a safe and sanitary manner from the fork 3.

The apparatus can vary in length.

The hand grip 1 is constructed of hardwoods, plastics, or metal The shank 2 is constructed of hardwoods or metal.

The hand grip 1 can vary in length. All hand grips 1 consist of the uppermost/topmost aspect of the hand grip 1 at apex; a hole 4 of sufficient size is drilled one inch from the apex. A piece of material (lanyard) 6, a length of ten inches, is pulled through the hole 4 and tied into a knot.

A hole 6 is drilled into the bottom of the hand grip 1 toward the apex of the hand grip 1. A copper sleeve 7 is pressed into the hole 6 in the lower end of said hand grip 1 until it seats at the bottom of the drilled hole 6.

The shank 2 is made of hardwood dowel rods, appropriate plastics, or metal. The top of the shank 2 is inserted into the copper sleeve 7 and then inserted into hand grip 1 at the lower end of said hand grip 1 until it seats in bottom of the drilled hole 6 at lower end of the hand grip 1. When seated into the copper sleeve 7, the hand grip 1 and shank 2 are properly lined up to ensure that fork 3 will be properly positioned at lower end of the shank 2. A groove 8 is cut into the hand grip 1 and lined up with food removal rod 21, a component of the food transfer system. When all components are properly aligned a hole 9 is drilled one and a half inches up from the bottom of hand grip 1 horizontally through both the shank 2 and hand grip 1 at the same time creating a comparable hole 9A in said shank 2 including the copper sleeve 7 and out the other side of hand grip 1. This horizontal hole 9 permits a pull ring pin 10 feature of proper length and diameter to be inserted into the drilled hole 9 and pushed through the hand grip 1 through copper sleeve 7 into shank 2 and exiting out other side of hand grip 1.

At the lowermost end of shank 2, a hole 11 is drilled into said shank 2 toward the hand grip 1. A copper sleeve 12 is pressed onto the outer diameter of shank 2 at the end where the drilled hole 11 is located. A function of the copper sleeve 12 is to strengthen the end of the shank 2 and to ensure the screw threads 13 of the fork 3 will not break when said fork 3 screw threads are fully threaded into the lower end of the shank 2. Hardwood shanks 2 are coated with a fire resistant coating. The copper sleeve 12 adds further protection for the fork 3 end of the shank 2. The fork 3 is forged of metals.

The rearward roasting fork apparatus embodies a rearward facing fork 3, shank 2, hand grip 1, and food transfer system 19. Said rearward fork roasting apparatus orients the position of the fork 3 such that the tapered points 14 of the two prongs 15, face rearward toward the hand grip 1. The fork 3 includes a metal rod 16 and is tapped with threads 13. At the opposite end of metal rod 16, said rod extends one inch beyond two prongs 15 and is terminal end 34 of said metal rod 16 and is welded to prongs 15. Said metal rod 16 has four bends. At lowermost end of fork 3 said metal rod 16 bends upward 45° then bends backward 45° to the original orientation causing it to run parallel the total length of the prongs 15. At this point the metal rod 16 bends downward 45° an equal distance as the first upward 45° bend, then bends a final time to a parallel orientation to the prongs 15 where it is then threaded into the shank 2. One and a half inches before the terminal end of the prongs 15, said prongs 15 are bent 45° downward where the ends of prongs 15 come to a tapered point 14. Rearward roasting apparatus includes safety tip covers 39 for prongs 15.

The food removal plate 20 on the food transfer system 19 glides along the prongs 15 of the fork 3 of the rearward fork roasting apparatus. The food transfer system 19 consists of the food removal plate 20, food removal rod 21, eye screws 22, nut 23, wing nut 24, lock washer 25, and said food removal rod 21 with trigger-like feature 33 end protector 26. The food removal plate 20 is constructed of die-cut metal. At centermost point of the top edge of the food removal plate 20, a notch 27 is punched out that permits said food removal plate 20 to glide both forward and backward along the metal rod 16 and is threaded into the lower end of the shank 2 where the upper copper sleeve 12 is pressed onto the end of said shank 2. Punched into the lower edge of the food removal plate 20 are two notches 28 which allow the food removal plate 20 to glide both forward and backward along the two prongs 15 of fork 3. Attached to the food removal plate 20, a hole 29 is punched out next to the notch 27 on the upper edge of the food removal plate 20. The food removal rod 21 with attached nut 23 on threaded rod portion 30 is inserted into hole 29 of the food removal plate 20. A lock washer 25 and wing nut 24 secures said food removal rod onto the end of the food removal plate 20. The food transfer system 19 also contains two threaded eye screws 22. One is located at the lower end of the shank 2 and the other is located at the upper end of said shank 2. Both eye screws 22 with tapered threads 32 are threaded into holes 31 which are drilled into said shank 2.

In the hand grip 1 a groove 8 is cut vertically at a depth of one eighth inch stating at the bottom end of said hand grip 1 and ending towards the apex end of said hand grip 1. The groove 8 provides a path for the food removal rod 21 to travel through. Both eye screws 22 and groove 8 in the hand grip 1 permit the food removal rod 21 to glide easily forward and backward. At the upper end of the food transfer system 19 the food removal rod 21 bends outward from the hand grip 1 away from said hand grip 1 providing a trigger-like 33 feature that the user can use to pull or push the food removal rod 21 backward or forward activating the food removal plate.

The forward roasting fork apparatus embodies a forward facing fork 3, shank 2, hand grip 1, and a food transfer system 19. Both hand grip 1 and shank 2 are held securely in place via a pull ring pin 10 inserted into the horizontally drilled hole 9.

The forward fork roasting apparatus's fork 3 consists of a threaded metal rod 13 and prongs 38 such that said prongs 38 face forward away from user with tapered points 18 to be located at lowermost position from hand grip 1. The threaded portion 13 is threaded into the shank 2. The other end is welded to the prongs 38. Forward roasting apparatus includes safety tip covers 3 for the prongs 33.

The forward fork roasting apparatus's fork 3 is threaded into lower end of the shank 2 via a hole 11 drilled into the lower end of said shank 2, such that the screw threads 13 are threaded into said hole 11. Opposite end of screw thread 13 rod is welded to the forward facing prongs 38 at the middlemost point. The screw threads 13 are turned into the hole 11 into the shank 2.

The forward fork roasting apparatus's fork 3 is equipped with the food transfer system 19 which includes food removal plate 35 component. Connected to said food removal plate 36 is the food removal rod 17 of sufficient length and thickness. At the food removal plate 35 a punched hole 36 of sufficient size to permit the food removal rod 17 is located at the centermost point of said food removal plate 35 one and a half inches from the bottom of the food removal plate 36. The food removal rod 17 is threaded with machine threads 30 for a length of one inch onto said food metal rod's 17 lowest end where a nut 23 is then turned onto the threads until it seats at the end of the threads. The food removal rod 17 is inserted through the punched hole 36 located and centered toward the lower portion of the food removal plate 35. A lock washer 25 is then placed on the threaded end after which a wing nut 24 of the appropriate size is then turned onto the threaded end of the food removal rod 17 now positioned through the punched hole 36 in the food removal plate 35 securing said plate 35 in proper position. The wing nut 24 is then hand-tightened until seated against the lock washer 25 on the surface of the food removal plate 35.

Two holes 37 are punched into the food removal plate 35. Said holes 37 permit said food removal plate 36 to glide along the prongs 38 when pulling or pushing the food removal plate 35 backward or forward with the food removal rod 17. The punched holes 37 in the food removal plate 35 are sufficiently large enough to allow the prongs 38 of the fork 3 to move freely in relation to the food removal plate 35.

The food removal rod 17 extends from the food removal plate 35 upward toward the hand grip 1. Two eye screws 22 with tapered threads 32 are threaded into holes 31 which are drilled into the shank 2 one inch below copper sleeve 7 located near hand grip 1 and one inch above copper sleeve 12 located at bottom of shank 2. A groove 8 is cut into the hand grip 1 and lined up with food removal rod 21, a component of the food transfer system. When all components are property aligned a hole 9 is drilled one and a half inches up from the bottom of hand grip 1 horizontally through both the shank 2 and hand grip 1 at the same time creating a comparable hole 9A in said shank 2 including the copper sleeve 7 and out the other side of hand grip 1. This horizontal hole 9 permits a pull ring pin 10 feature of proper length and diameter to be inserted into the drilled hole 9 and pushed through the hand grip 1 through copper sleeve 7 into shank 2 and exiting other side of hand grip 1.

The food removal rod 17 passes down through the two eye screws 22 on the shank 2 and ultimately attaches to the food removal plate 35. At the upper and of the food transfer system 19 the food removal rod 17 bends outward from the hand grip 1 away from said hand grip 1 providing a trigger-like 33 feature that the user can use to pull or push the food removal rod 17 backward or forward activating the food removal plate.

After roasting the food a user can activate the food removal rod 17, in turn activating the complete food transfer system 19 to safely and conveniently remove said food from the hot fork 3 onto a plate providing sanitary food handling and eliminating potential burn injury. The purpose of the wing nut 24 and the lock washer 25 attaching the food removal plate 35 to the food removal rod 17 is to facilitate disassembly, making cleanup of the food removal system 19 sanitary, convenient, and easy.

In summary while the description above describes some of the main features—hand grip, shank, fork, and food transfer system—of this invention, it should not be construed as to constrain the scope of possibilities i.e., size, length, or materials of both the rearward or forward roasting apparatuses thus making possible the replication by one with the appropriate skills in the art.

These contrivances, the rearward and forward roasting fork apparatuses, provide the user to be safely distanced from open flame and heat while the food transfer system which provides for a more sanitary, hands-free means of removing foodstuff, also greatly reduces burn injuries from accidentally coming in contact with hot metal forks or metal shanks.

The invention claimed is:

1. A cooking device, consisting of:
   a hand grip;
   a shank;
   a roasting fork; and
   a food transfer system;
   wherein the hand grip has an apex end and a bottom end opposite the apex end, wherein a first hole is formed in the bottom end and a first sleeve is arranged inside of the first hole and is seated at a bottom end of the first hole,
   wherein the shank has a fork end and a hand grip end, wherein the hand grip end of the shank is inserted into the first hole having the first sleeve such that it is seated inside the first sleeve at the bottom end of the first hole,
   wherein a second hole formed in the cooking device passes entirely through the hand grip, the first sleeve, and the shank in the bottom region of the hand grip and a ring pin is arranged through said second hole to secure the shank to the hand grip while permitting disassembly of the hand grip and shank by removing the ring pin,
   wherein the shank has a third hole formed at its fork end and a second sleeve is arranged inside of the third hole and is seated at a bottom end of the third hole, wherein the roasting fork has a metal rod having a shank end tapped with threads and a prong end opposite the shank end, wherein the shank end is inserted into the third hole having the second sleeve such that it is seated inside the second sleeve at a bottom end of the third hole, therein the metal rod is connected to two rearward facing prongs having tapered points facing toward the hand grip,
   wherein the food transfer system includes a food removal rod connected to a movable planar food removal plate through a fourth hole, wherein the fourth hole is punched out of the food removal plate, wherein the food removal rod is arranged within a vertical groove cut into the hand grip and is secured against the shank using a plurality of threaded eye screws arranged on the shank, wherein food removal rod has an upturned portion usable by an operator to push or pull the removal rod, wherein the removal plate contains a roasting fork notch and two prong notches to permit the removal plate to slide relative to the roasting fork when the upturned portion is actuated by the operator, wherein the fourth hole is arranged adjacent to the fork notch,
   wherein the food removal rod is connected to the food removal plate using a nut, wing nut, and a lock washer,
   wherein the hand grip is formed of a material selected from the group consisting of hardwoods, plastics, and metals,
   wherein the shank is formed of a material selected from the group consisting of hardwood dowel rods and metals,
   wherein the roasting fork is formed of a material selected from the group consisting of metals,
   wherein the first sleeve and the second sleeve are formed of copper,
   wherein the metal rod has a bent structure having two 45-degree bends, wherein a first bend of the two bends is arranged adjacent to the shank end, wherein a second bend of the two bends is arranged adjacent to the prong end,
   wherein each of the two rearward facing prongs has a 45-degree downward bend at their respective ends having the tapered points.

* * * * *